United States Patent [19]

Salee

[11] 4,211,687

[45] Jul. 8, 1980

[54] POLYMER BLENDS WITH IMPROVED FLAME RETARDANCE

[75] Inventor: Gideon Salee, Williamsville, N.Y.

[73] Assignee: Hooker Chemicals & Plastics Corp., Niagara Falls, N.Y.

[21] Appl. No.: 863,556

[22] Filed: Dec. 22, 1977

Related U.S. Application Data

[63] Continuation-in-part of Ser. No. 819,539, Jul. 27, 1977.

[51] Int. Cl.$^2$ ............................ C08K 7/14; C08L 67/02
[52] U.S. Cl. ............................ 260/40 R; 260/45.7 R; 260/45.7 RT; 260/DIG. 24; 525/418; 525/537
[58] Field of Search ............ 260/860, 876 R, 876 B, 260/37 R, 40 R, 45.7 R, 45.7 RT, DIG. 24, 823

[56] References Cited

U.S. PATENT DOCUMENTS

| | | | |
|---|---|---|---|
| 3,354,129 | 11/1967 | Edmonds, Jr. et al. | 260/79 |
| 3,819,759 | 6/1974 | Weaver et al. | 260/860 |
| 4,020,124 | 4/1977 | Abolins et al. | 260/876 R |
| 4,045,382 | 8/1977 | Braese et al. | 260/876 R X |
| 4,046,836 | 9/1977 | Adelmann et al. | 260/860 |
| 4,075,262 | 2/1978 | Schaefgen | 260/860 |

FOREIGN PATENT DOCUMENTS

| | | |
|---|---|---|
| 51-59952 | 5/1976 | Japan . |
| 52-25852 | 2/1977 | Japan . |
| 420386 | 11/1934 | United Kingdom . |
| 1049097 | 11/1966 | United Kingdom . |

OTHER PUBLICATIONS

Platzer, *Polymerization Reactions and New Polymers* (ACS, 1973), pp. 80–106.
Ency. Poly. Sci. & Tech., 10, pp. 653–659.
Lyons, *The Chem. & Uses of Fire Retardants,* (Wiley-Interscience, 1970), pp. 380–398; 420–423.
Ency. Poly. Sci. and Tech., 10, pp. 98, 101.

*Primary Examiner*—Theodore E. Pertilla
*Attorney, Agent, or Firm*—Peter F. Casella; James F. Mudd; David A. Stein

[57] ABSTRACT

This invention relates to polymer blends having improved hydrolytic stability, moldability and flame retardancy which comprises, in admixture, (1) a linear aromatic polyester prepared from an aromatic dicarboxylic acid and a bisphenol, and (2) polyphenylene sulfide. Desirably these compositions contain as flame retardant a Diels Alder adduct of a halocyclopentadiene and a mono- or di- unsaturated organic component.

15 Claims, No Drawings

POLYMER BLENDS WITH IMPROVED FLAME RETARDANCE

CROSS-REFERENCE TO COPENDING APPLICATION

This is a continuation-in-part of copending U.S. Application Ser. No. 819,539 filed July 27, 1977.

BACKGROUND OF THE INVENTION

Linear aromatic polyesters prepared from aromatic dicarboxylic acids and bisphenols are well known for their suitability for molding, extrusion, casting, and film-forming applications. For example, U.S. Pat. No. 3,216,970 to Conix, discloses linear aromatic polyesters prepared from isophthalic acid, terephthalic acid, and a bisphenolic compound. Such high molecular weight compositions are known to be useful in the preparation of various films and fibers. Further, these compositions, when molded into useful articles using conventional techniques, provide properties superior to articles molded from other linear polyester compositions. For instance, aromatic polyesters are known to have a variety of useful properties, such as good tensile, impact, and bending strengths, high thermal deformation and thermal decomposition temperatures, resistance to UV irradiation and good electrical properties.

Aromatic polyesters which are particularly well suited for molding applications may also be prepared by reacting an organic diacid halide with a difunctional aliphatic reactive modifier, such as a glycol, and subsequently reacting this product with a bisphenol compound. The resulting polyesters have reduced melt viscosities and melting points which permits molding at temperatures within the operable limits of conventional molding apparatus (i.e. less than about 300° C.). This type of glycol-modified polyester is more fully disclosed in U.S. Pat. No. 3,471,441, to Hindersinn.

In order to form a successful molding resin on a commercial scale, a polymer should be capable of being molded conveniently without significant degradation in physical properties. In this respect, although the aforementioned aromatic polyesters generally display excellent physical and chemical properties, a persistent and troublesome problem has been their sensitivity to hydrolytic degradation at elevated temperatures. This sensitivity to the combined effects of heat and moisture is also exhibited in commercially available polycarbonate resins as evidenced by the desirability of reducing the water content of the resin to less than about 0.05% prior to molding. Unfortunately, however, the aromatic polyester resins often display a more pronounced tendency to rapidly degrade and embrittle than do polycarbonate resins. This is demonstrated by the loss of tensile strength which can occur when an aromatic polyester resin is moled and subsequently immersed in boiling water. This tendency may be explained, in part, by the hydrolysis of the ester linkages under these conditions. In any event, it is to be appreciated that sensitivity to moisture represents a significant problem in aromatic polyester resins that would significantly limit their commercial utility in applications such as in autoclaves or at elevated temperatures in humid atmospheres.

Accordingly, it is a principal object of this invention to prepare aromatic polyester compositions having superior physical and chemical properties as well as improved hydrolytic stability.

SUMMARY OF THE INVENTION

It has now been found that polyester molding compositions having improved hydrolytic stability may be prepared by blending a linear aromatic polyester with polyphenylene sulfide. The linear aromatic polyesters of this invention, are prepared from bisphenols and at least one aromatic dicarboxylic acid, most preferably selected from the group consisting of isophthalic acid, terephthalic acid, or mixtures thereof. Desirably these compositions contain as flame retardant a Diels-Alder adduct of a halocyclopentadiene and a mono-or di-unsaturated organic compound.

DESCRIPTION OF THE PREFERRED EMBODIMENTS

The linear aromatic polyesters of the present invention can be prepared by condensing a diacid halide of a dicarboxylic acid, dissolved in an organic liquid which is a solvent for the polyester to be formed, with a metal phenolate of a bisphenol, dissolved in a liquid which is immiscible with the solvent for the diacid halide. This process is more fully described in U.S. Pat. No. 3,216,970, to Conix, the disclosure of which is incorporated herein by reference.

Another suitable process which can be used to prepare linear aromatic polyesters suitable for use in this invention utilizes the known ester-interchange reaction between a diaryl ester of a dicarboxylic acid and a diphenolic compound such as described in British Pat. No. 924,607, to Imperial Chemical Industries Limited, the disclosure of which is incorporated herein by reference.

The linear aromatic polyesters employed in the invention are devoid of ethylenic and acetylenic unsaturation and of residues of aliphatic polyhydroxy compounds. The present polyesters and the mixtures thereof with polyphenylene sulfide are non-elastomeric.

The bisphenol which can be used in this process are known in the art and correspond to the general formula:

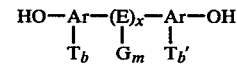

wherein Ar is aromatic, preferably containing 6–18 carbon atoms (including phenyl, biphenyl and napthyl); G is alkyl, haloalkyl, aryl, haloaryl, alkylaryl, haloalkylaryl, arylalkyl, haloarylalkyl, cycloalkyl, and halocycloalkyl; E is a divalent (or di-substituted) alkylene, haloalkylene, cycloalkylene, halocycloalkylene, arylene, or haloarylene, —O—, —S—, —SO—, —SO$_2$—, —SO$_3$—, —CO—, GP<=O or GN<; T and T' are independently selected from the group consisting of halogen, such as chlorine or bromine, G and OG; m is an integer from O to the number of replaceable hydrogen atoms on E; and x is O or 1. When there is a plurality of G substituents in the bisphenols, such substituents may be the same or different. The T and T' substituents may occur in the ortho, meta or para-positions with respect to the hydroxyl radical. The foregoing hydrocarbon radicals preferably have carbon atoms as follows:

alkyl, haloalkyl, alkylene and haloalkylene of 1 to 14 carbons; aryl haloaryl, arylene and haloarylene of 6 to 14 carbons; alkylaryl, haloalkylaryl, arylalkyl and haloarylalkyl of 7 to 14 carbons; and cycloalkyl, halocycloalkyl, cycloalkylene and halocycloalkylene of 4 to 14 carbons. Additionally, mixtures of the above described bisphenols may be employed to obtain a polymer with especially desired properties. The bisphenols generally contain 12 to about 30 carbon atoms, and preferably 12 to about 25 carbon atoms.

Typical examples of bisphenols having the foregoing formula include bis(4-hydroxyphenyl)methane, bis(2-hydroxyphenyl)methane, 4-hydroxyphenyl, 2-hydroxyphenyl methane and mixtures thereof; bis(3-methyl-4-hydroxyphenyl)-methane, bis(4-hydroxy-3,5-dichlorophenyl)methane, bis(4-hydroxy-3,5-dibromophenyl)methane, bis(4-hydroxy-3,5-difluorophenyl)methane, bisphenol-A[bis-(4-hydroxyphenyl)-2,2-propane], bis(3-chloro-4-hydroxyphenyl)-2,2-propane, bis(4-hydroxy-3,5-dichlorophenyl)-2,2-propane, bis(4-hydroxynaphthyl)-2,2-propane, bis(4-hydroxyphenyl)phenyl methane, bis(4-hydroxyphenyl)diphenyl methane, bis(4-hydroxyphenyl)-4'-methyl phenyl methane, bis(4-hydroxyphenyl)-4'-chlorophenyl methane, bis(4-hydroxyphenyl)2,2,2-trichloro-1,1,2-ethane, bis(4-hydroxyphenyl)-1,1-cyclohexane, bis(4-hydroxyphenyl)cyclohexyl methane, 4,4-dihydroxyphenyl, 2,2'-dihydroxydiphenyl, dihydroxyhaphthylenes, bis(4-hydroxyphenyl)-2,2-butane, bis(2,6-dichloro-4-hydroxyphenyl)-2,2-propane, bis(2-methyl-4-hydroxyphenyl)-2,2-propane, bis(3-methyl-4-hydroxyphenyl)-1,1-cyclohexane, bis(2-hydroxy-4-methylphenyl)-1,1-butane, bis(2-hydroxy-4-terbutylphenyl)-2,2-propane, bis(4-hydroxyphenyl)-1-phenyl-1,1-ethane, 4,4'-dihydroxy-3-methyl diphenyl-2,2-propane, 4,4'-dihydroxy-3-methyl-3'-isopropyl diphenyl-2,2-butane, bis(4-hydroxyphenyl)sulfide, bis(4-hydroxyphenyl)ketone, bis(4-hydroxyphenyl)oxide, bis(4-hydroxyphenyl)sulfone, bis(4-hydroxyphenyl) sulfoxide, bis(4-hydroxyphenyl)sulfonate, bis(4-hydroxyphenyl)amine, bis(4-hydroxyphenyl)phenyl phosphine oxide. 2,2-bis(3-chloro-4-hydroxyphenyl)-propane; 4,4'-(cyclohexymethylene) bis(2,6-dichlorphenol); 2,2-bis-(3,5-dichloro-4-hydroxyphenyl)-propane, 2,2-bis-3,5-dibromo-4-hydroxyphenyl)-propane, 1,1-bis-(3,5-dichloro-4-hydroxyphenyl)-1-phenylethane, 2,2-bis-(3,5-dibromo-4-hydroxyphenyl)-hexane, 4,4'-dihydroxy-3,3', 5,5'-tetra-chlorodiphenyl, 2,2-bis-(3-chloro-4-hydroxyphenyl)-propane, 2,2-bis-(3,5-dibromo-4-hydroxyphenyl)-propane, 2,2-bis-(3,5-dichloro-4-hydroxyphenyl)-propene, tetrachlorodiphenylolsulfone, bis(3,5-dibromo-4-hydroxyphenyl)-phenyl phosphine oxide, bis(3,5-dibromo-4-hydroxyphenyl)-sulfoxide, bis(3,5-dibromo-4-hydroxy-phenyl)-sulfone, bis(3,5-dibromo-4-hydroxyphenyl)-sulfonate, bis(3,5-dibromo-4-hydroxyphenyl)-sulfide, bis(3,5-dibromo-4-hydroxyphenyl)-amine, bis(3,5-dibromo-4-hydroxyphenyl)-ketone, and 2,3,5,6,2',3',5',6',-octochloro-4,4'-hydroxy biphenyl. Representative biphenols are o,o-biphenol, m,m'biphenol; p,p'-biphenol; bicresols, such as 4,4'-bi-o-cresol, 6,6-bi-o-cresol, 4,4'-bi-m-cresol; dibenzyl biphenols such as a,a'-diphenol-4,4'-bi-o-cresol; diethyl biphenols such as 2,2'-diethyl-p,p;-biphenol, and 5,5'-diethyl-o,o'-biphenol; dipropyl biphenols such as 5,5'-dipropyl-o,o'-biphenol and 2,2'-diisopropyl-p,p'-biphenol; diallyl biphenols such as 2,2'-diallyl-p,p'-biphenol; and dihalobiphenols, such as 4,4'-dibromo-o,o'-biphenol. Mixtures of isomers of the foregoing bisphenols can be used.

The dicarboxylic acids which are useful in this process are also well known and can be represented by the formula:

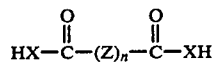

in which X is oxygen or sulfur, Z is alkylene, —AR— or —AR—Y—Ar— where Ar has the same definition as given with respect to the bisphenols, Y is alkylene, of 1 to 10 carbons, haloalkylene, —O—, —S—, —SO—, —SO$_2$—, —SO$_3$—, —CO—, GP<=O or GN<; and n is 0 or 1.

Suitable dicarboxylic acids include aromatic dicarboxylic acids such as phthalic acid, isophthalic acid, terephthalic acid, bis(4-carboxy)-diphenyl, bis(4-carboxyphenyl)-ether, bis(4-carboxyphenyl)-sulfone, bis(4-carboxyphenyl)-carbonyl, bis(4-carboxyphenyl)-methane, bis(4-carboxyphenyl)-dichloromethane, 1,2- and 1,1-bis(4-carboxyphenyl)-ethane, 1,2- and 2,2-bis(4-carboxyphenyl)-propane, 1,2- and 2,2-bis(3-carboxyphenyl)-propane, 2,2-bis(4-carboxyphenyl)-1, 1-dimethyl propane, 1,1- and 2,2-bis(4-carboxphenyl)-butane, 1,1- and 2,2-bis(4-carboxyphenyl)-pentane, 3,3-bis-(4-carboxyphenyl)-heptane, 3,3-bis(3-carboxyphenyl)-heptane, and aliphatic acids such as oxalic acid, adipic acid, succinic acid, malonic acid, sebacic acid, glutaric acid, azelaic, suberic acid and the like. Isophthalic acid and terephthalic acid are preferred due to their availability and low cost. Most preferably, the dicarboxylic acid component comprises a mixture of about 75 to about 100 mol percent isophthalic acid and about 25 to about 0 mol percent terephthalic acid.

When the dicarboxylic acids used in preparing a polyester of the invention consist of both isophthalic and terephthalic acids in accordance with an expecially preferred embodiment of the invention, a weight proportion of isophthalic to terephthalic acid residues in the polyester ranging from about 75:25 to about 90:10 provides an especially satisfactory result.

The polyphenylene sulfide component of the instant invention is a crystalline polymer with a repeating structural unit comprising a para-substituted benzene ring and a sulfur atom which may be described by the formula, where n has a value of at least about 100.

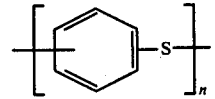

The preparation of polyphenylene sulfide is illustrated in U.S. Pat. No. 3,354,129, to Edmonds, Jr., et al., the disclosure of which is incorporated herein by reference, wherein at least one polyhalo-substituted cyclic compound is reacted with an alkali metal sulfide in a polar organic solvent reaction medium. Suitable polyphenylene sulfide compositions are available commercially under the trade name RYTON of the Phillips Petroleum Company, and include compositions which are either unfilled, or filled with glass or some such conventional material. Preferably, the polyphenylene sulfide component has a melt flow index, measured at 600° F. using a 5 Kg. weight and a standard orifice, within the range of from about 40 to about 7000.

The novel resin compositions of the instant invention are prepared by blending the linear aromatic copolyester with polyphenylene sulfide. The blending or mixing process can be performed using conventional mixing equipment such as, for example, a Banbury mixer, mixing roll, kneader, screw extruder, or injection molding machine. Although the mixing ratio may vary depending on the physical properties desired in the resultant polymer blend, the polyphenylene sulfide component is present preferably in an amount of about 5 parts to about 95 parts by weight of blended polymer, and most preferably, about 5 parts to about 30 parts by weight of polyblend.

The novel polymer compositions of the present invention contain a effective flame retardant proportion of a halogen-containing Diels Alder adduct of (A) a cyclopentadiene wherein all of the hydrogen atoms of the carbon atoms joined by carbon-to-carbon double bonds have been replaced by halogen, e.g. fluorine, chlorine, or bromine and (B) an ethylenically unsaturated organic compound containing one or two carbon-to-carbon double bonds; the molar proportion of the cyclopentadienyl residue to unsaturated compound residue in said adduct being 1:1 when the unsaturated compound contains one carbon-to-carbon double bond, and 2:1 when the unsaturated compound contains two carbon-to-carbon double bonds.

Preferably the Diels Alder adduct employed as flame retardant agents according to the invention is derived from a cyclic compound having two intracyclic carbon-to-carbon double bonds and has the structural formula:

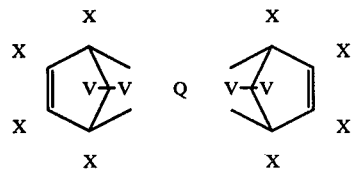

wherein X is selected from chlorine, bromine and fluorine, V is selected from chlorine, bromine, fluorine, alkyl of 1 to 10 carbon atoms, alkyloxy wherein the alkyl group contains 1 to 10 carbon atoms, haloalkyl and haloalkyloxy wherein the alkyl groups contain 1 to 10 carbon atoms and halo is chloro, bromo, or fluoro; Q is a tetravalent saturated cyclic radical having at least 4 carbon atoms which may be substituted by alkyl groups of 1 to 6 carbon atoms, chlorine, bromine or fluorine. The alkyl and alkoxy radicals preferably have 1 to 6 carbon atoms. Q is preferably a tetravalent homocyclic radical of 5 to 18 carbon atoms or a tetravalent heterocyclic radical of 4 to 18 carbon atoms and preferably has 1 to 5 cyclic structures. When Q is a plurality of cyclic structures, they are fused, that is, share carbon atoms. In especially preferred halogen-containing fire retardant agents of the invention Q is a homocyclic radical, more preferably a homocyclic monocyclic radical and especially is a homocyclic, monocyclic radical containing only hydrogen substituents. In especially preferred adducts of the invention Q has no more than 10 carbon atoms.

The fire retardant additives of the invention are known compounds prepared by the Diels Alder reaction of halogenated cyclopentadiene and an open chain unsaturated compound (such as ar-tetrabomostyrene), a di-unsaturated homocyclic aliphatic compound (such as 1,5-cyclooctadiene, cyclopentadiene, 1,4-cyclohexadiene, bicyclo(-2.2.1)heptadiene and 1,2,3-trichloro-1,4-cyclohexadiene) or a di-unsaturated heterocyclic aliphatic compound containing divalent sulfur or oxygen as the hetero-ring atom constituent as exemplified by furan or thiophene. Also there may be employed as the heterocyclic reactant a mono alkyl or di-alkyl derivative of furan or thiophene wherein one or both of the carbon atoms attached to the hetero-ring atom contain an alkyl substituent of 1 to 6 carbon atoms such as 1-methyl furan, 1-hexyl furan, 1,4 dipropyl furan, 1-methyl thiophene, 1,4-dihexyl thiophene and the like.

Illustrative of halogenated cyclopentadiene compounds suitable for preparing the fire retardant additive are hexachlorocyclopentadiene, 5,5-dimethoxytetrachlorocyclopentadiene, hexabromocyclopentadiene, 5,5-difluorotetrachlorocyclopentadiene, 5,5-dibromotetrachlorocyclopentadiene and 5,5-diethoxytetrachlorocyclopentadiene.

Typical of the Diels Alder adducts described hereinabove which can be used in the practice of the invention:

1,2,3,4,7,8,9,10,13,13,14,14-dodecachloro-1,4,4a,5,6-,6a,7,10,10a,11,12,12a-dodecahydro-1,4:7,10,-dimethanodibenzo[a,e]cyclooctene;

1,2,3,4,6,7,8,9,13,13,14,14-dodecachloro-1,4:5,10:6,9-trimethano-11H-benzo[b]-fluorene;

1,2,3,4,5,6,7,8,10,10,11,11-dodecachloro-1,4:5,8-dimethanofluorene;

1,2,3,4,5,6,7,8,12,12,13,13-dodecachloro-1,4:5,8:9,10-trimethano-anthracene;

1,2,3,4,5,6,7,8,11,11,12,12-dodecachloro-1,4,4a,5,8-,8a,9,9a,10,10a,decahydro-1,4,5,8-dimethanoanthracene;

1,2,3,4,6,7,8,9,10,10,11,11-dodecachloro-1,4,4a,5-,5a,6,9,9a,9b-octahydro-1,4:6,9-dimethanodibenzothiophene; and 1,2,3,4,6,7,8,9,10,10,11,11-dodecachloro-1,4,4a,5-,5a,6,9,9a,9b-octahydro-1,4:6,9-dimethanodibenzofuran.

Mixtures of these and equivalent adducts can also be employed.

The preparation of the aforementioned known halogen-containing Diels Alder adducts is more particularly described in R. D. Carlson et al. U.S. Pat. No. 3,711,563 (especially at Column 8), W. Seydl, U.S. Pat. No. 3,923,728 (to B.A.S.F.-A.G.), I. Gordon et al. U.S. Pat. No. 4,000,114, R. R. Hindersinn et al. U.S. Pat. No. 3,535,253 and J. L. Dever et al. U.S. Pat. No. 3,687,983 the disclosures of which are incorporated herein by reference.

The proportion of the halogen-containing flame retardant adduct compound employed according to the invention is generally from about 1 to less than about 50 weight percent, preferably about 2 to about 30 weight percent, based on the combined weight of the polyester and polyphenylene sulfide. An especially good result is obtained employing about 3 to about 15 weight percent of the halogen-containing adduct based on the combined weight of the polyester and the sulfide polymer components.

The presence of the halogen-containing Diels Alder adduct in the compositions of the invention greatly enhances the flame retardance of the polyester-sulfide polymer blend without detrimentally affecting the other desirable properties of these compositions. The flame retardance is enhanced to the extent that excellent flame retardant performance is achieved even when the compositions are molded in extremely thin sections, (e.g. of thicknesses less than about 1/16 of an inch). This excellent flame retardance performance makes the present compositions especially suitable for the fabrication of electrical components such as miniature circuit boards and the like.

The novel polymer compositions of the invention may also include various additives such as fillers, stabilizers, antistatic agents, and the like. However, it is found according to the invention that antimony additives including metallic antimony as well as antimony compounds are detrimental to the flame retardant properties of the compositions of the invention containing the aforementioned halogenated adduct. Alternatively, the use of an antimony additive in a polymer composition of the invention containing the aforementioned adduct undesirably embrittles the composition. Accordingly, the use of such antimony additives is avoided in the practice of the invention.

The fillers which may be employed in the invention include conventional particulate fillers such as particulate glass (e.g. glass fiber, glass microspheres, or pulverulent glass) as well as clay, talc, inorganic or organic fibers, alumina, silica, calcium carbonate, graphite, carbon black, magnesia and the like. Generally such fillers are added to reinforce the structural integrity of a polymer, e.g. to exhibit sagging and/or to improve the tensile strength and stiffness of the polymer composition (and also to reduce shrinkage, minimize crazing, lower material costs, impart color or opacity and improve the surface finish of the polymer compositions). Generally the amount of particulate filler employed in the composition of the invention is in the range of about 5 to about 70 weight percent, preferably about 5 to about 40 weight percent and especially about 8 to about 30 weight percent based on the combined weight of the polyester and the phenylene sulfide polymer.

In the compositions of the invention wherein fire retardance is enhanced by the presence of the present halogen-containing adduct, the filler preferably employed is particulate glass and is especially glass fiber.

The filled mixtures of the invention are prepared by conventional blending techniques employing a conventional mixing apparatus such as a premix mixer or melt extruder to blend the polyester, the sulfide polymer, the halogen-containing fire retardant agent, and filler. The filled compositions can then be molded in an injection molding apparatus or an extruder. The molded articles thus formed have excellent hydrolytic stability and tensile strength.

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

EXAMPLE 1

PREPARATION OF LINEAR AROMATIC POLYESTER

A mixture of 165.7 parts isophthaloyl chloride, 29.2 parts terephthaloyl chloride, and 223.5 parts bisphenol-A (2,2-bis(4-hydroxyphenyl) propane) were dissolved in 2270 parts methylene chloride (having a moisture content of 10 ppm of water) in a reactor at 25° C. 200.7 parts triethyl amine were added at a constant rate to the reaction mixture over a period of 7.5 hours, under nitrogen purge with stirring. The reaction mixture was maintained at 15° C. After completion of the triethylamine addition, the mixture was stirred for two hours at 20° C. 6.8 parts of benzoyl chloride were then added to react with the end-groups of the polymer. After one hour, 13.7 parts isopropanol were added to react with any excess benzoyl chloride. After ½ hour, dilute aqueous hydrogen chloride (570 parts of a 0.5 wt.% sol.) was added to react with any excess triethylamine for an additional ½ hour with stirring. The two phases were then allowed to separate by gravity, and the water phase was removed. Additional washes of the polymer solution with equal amounts of water were carried out until the chloride ion in the polymer solution measured less than 0.1 ppm. The polymer was then precipitated from solution and dried in a vacuum oven until the moisture concentration was less than 0.1 wt. %. The resultant high molecular weight polymer had an intrinsic viscosity of 0.74 dl/g in sym. tetrachloroethane (at 30° C.).

EXAMPLE 2

PREPARATION OF MOLDING COMPOSITION

A linear aromatic polyester was prepared according to the procedure of Example 1 and dried for four hours at 120° C. 100 parts of polyphenylene sulfide (commercially sold under the trade name RYTON V-1 by the Phillips Petroleum Company), having a melt flow index of 6,000 as determined at 600° F. with a 5 Kg. weight using a standard orifice, was added to 900 parts of polyester and tumble mixed for 0.5 to 1 hour. The blend was milled on a two roll Farrell Mill (front roll heated to 480° F., black roll heated to 425° F.) for 1.5–3.0 minutes at 45 r.p.m. The blend was then sheeted, and ground to 4 m.m. granule size on a granulator. The granules were dried for 1–2 hours at 120° C. and injection molded to produce tensile and flex bars. The injection molding conditions were as follows:

| MOLDING PARAMETERS | |
|---|---|
| Barrel Temperature (°F.) | 600 |
| Nozzle Temperature (°F.) | 580 |
| Mold Temperature (°F.) | 250 |
| Screw Speed (rpm) | 120 |
| Back Pressure (psi) | 625 |
| Injection Pressure (psi) | 11,200 |
| Plasticating Time (secs) | 8 |
| Fill Time (secs) | 3 |
| Total Injection Time (secs) | 10 |

The tensile bars thus prepared were tested and found to have the following physical properties. By way of comparison, a control, which does not include polyphenylene sulfide, is also shown.

| PROPERTIES | | |
|---|---|---|
| | Example 2 | Control |
| Tensile Strength (psi) | 10,150 | 10,000 |
| Tensile Modulus (× 10⁵) | 3.09 | 3.34 |
| After 7 days immersion in boiling H$_2$O: | | |
| Tensile Strength (psi) | 10,800 | 1,700 |
| Tensile Modulus (psi × 10⁵) | 3.43 | 2.75 |

EXAMPLES 3–6

PREPARATION OF MOLDING COMPOSITION

A linear aromatic polyester was prepared according to the procedure of Example 1 and dried for four hours at 120° C. The procedure of Example 2 was followed to produce 4 mm granules.

The granules were dried for 4 hours at 120° C. and were then blended with polyphenylene sulfide pellets (commercially sold by the Phillips Petroleum Corp. under the tradename RYTON 6), having a melt flow index of 50 as determined at 600° F. with a 5 Kg. weight using a standard orifice in various mixing ratios. Tensile bars were prepared and tested, and the results are summarized in Table 1 below.

The aromatic polyesters of the invention generally have an intrinsic viscosity of at least 0.5 dl/g when measured in sym. tetrachloroethane at 30° C., and preferably at least 0.6 dl/g.

TABLE 1

|  | EXAMPLE 3 | EXAMPLE 4 | EXAMPLE 5 | EXAMPLE 6 |
|---|---|---|---|---|
| COMPOSITION |  |  |  |  |
| Polyester (parts) | 475 | 450 | 425 | 400 |
| Polyphenylene Sulfide (parts) | 25 | 50 | 75 | 100 |
|  | (5%) | (10%) | (15%) | (20%) |
| PROPERTIES |  |  |  |  |
| Tensile Strength (psi) | 10,200 | 10,200 | 10,400 | 10,500 |
| Tensile Modulus (psi $\times 10^5$) | 3.07 | 3.26 | 3.26 | 3.61 |
| After 7 days immersion in boiling water |  |  |  |  |
| Tensile Strength (psi) | 4,700 | 7,800 | 8,000 | 9,800 |
| Tensile Modulus (psi $\times 10^5$) | 3.43 | 3.48 | 3.43 | 3.68 |
| MOLDING CONDITIONS |  |  |  |  |
| Barrel Temperature (°F.) | 600 | 600 | 600 | 600 |
| Mold Temperature (°F.) | 250 | 250 | 250 | 250 |
| Injection Pressure (psi) | 23,300 | 18,900 | 16,600 | 14,400 |
| Screw Speed (rpm) | 230 | 230 | 230 | 240 |
| Plasticating Time (secs) | 9 | 8 | 8 | 7 |
| Fill Time (sec) | 4 | 6 | 4 | 5 |
| Total Injection Cycle (sec) | 40 | 40 | 40 | 40 |

EXAMPLE 7

About 450 parts of bisphenol A-isophthalate-terephthalate polyester resin having an isophthalate:terephthalate ratio of 5.67 which is prepared substantially as described in Example 1 was dried for about 4 hours at 120° and charged gradually to the Farrell Mill described in Example 2 which is operated with its front roll at 450° F. and its back roll at 410° F. until the fusion of the resin was complete and a band of clear resin formed on the front roll. About 50 parts of the polyphenylene sulfide resin of Example 2 was then added until a homogeneous resin band was formed on the front roll. In a similar manner, 20 parts of 1,2,3,4,7,8,9,10,13,14,14-dodecachloro-1,4,4a,5,6,6a,7,10,10a,11,12,12a-dodecahydro-1,4:7,10-dimethanodobenzo[a,e] cyclooctene herein referred to for brevity as "C.O.D." was added to the resin mixture in the mill.

The mixture of resins and C.O.D. was milled for about 1.5 to 3 minutes and was then sheeted from the mill, ground to granules of about 4 mm granule size as described in Example 2 and dried at 120° for 4 hours.

The dried resin blend granules were charged to an Arburg 221E/150 Injection molding maching operated at a barrel temperature of 550° F., a mold temperature of 275°–280° F. and an injection pressure of 20,000 psi to injection mold the C.O.D.-containing blend into specimen bars of about 5 inch length, ½ inch width and 1/16 inch thickness. Several of 1/16 inch thickness specimen were reserved for the flame retardant test described hereinbelow. The remainder of the 1/16 inch thick specimen bars were dried at 120° for 2 hours and compression molded between steel plate-backed aluminum sheets in a Carver Four Paten Laboratory Press operated at 400°–430° F. at a pressure of 30,000 to 35,000 psi to obtain specimen bars 5 inches in length, ½ inch in width and 1/32 inch in thickness.

The 1/16 inch- and 1/32 inch-thick bar specimens were evaluated in fire retardant properties according to the Vertical Burning Test described in "UL94-Standards For Safety", Underwriters Laboratories, Inc. Second Revised Edition, May 2, 1975, pages 6–8. In accordance with evaluation technique of the aforementioned test, the specimens were rated V-0, V-1, or V-2 with V-0 indicating the greatest degree of flame retardancy and V-2 indicating the poorest degree of flame retardancy. The Oxygen Index of a sample of injected molded resin blend obtained from Arburg Injection molding machine is also determined.

The results of these experiments are reported in Table 2 below.

EXAMPLE 8

The procedure of Example 7 was followed substantially as described through the step wherein the sheet of the blend of C.O.D., polyester and polyphenylene sulfide was obtained from the Farrell Mill was ground to granules of 4 m.m. granule size and dried at 120° for 4 hours.

The dried granules were mixed with 58.3 parts of chopped glass fiber (3/16 inch length, manufactured by Owens Corning Fiberglass Corporation under the designation 419AA). The resultant mixture was then added to an Arburg Alrounder 200 injection molding machine operated at a barrel temperature of 550° F., a mold temperature of 215°–225° F., and an injection pressure of about 20,000 psi.

The mixture was molded as bar specimens which were subsequently reground and dried substantially as described hereinabove to ensure that a homogeneous mixture of the glass fibers with the resin blend was obtained. The dried reground mixture was then charged to the Arburg 221E/150 Injection molding machine (operated at a barrel temperature of 550° F., at a mold temperature of 290°–295° F., and an injection pressure of about 20,000 psi) and molded as 5 inch $\times$ ½ inch $\times$ 1/16 inch specimen bars as described in Example 7. As in Example 7, a portion of the latter specimen bars were reserved for flame retardant testing and the remainder were compression molded to obtain 5 inch $\times$ ½ inch $\times$ 1/32 inch bar specimens. Both the 1/16 inch and 1/32 inch bar samples were tested for flame retardance as described in Example 7. The results of this Example are reported in Table 2 below.

EXAMPLE 9 (Control)

The procedure of Example 8 was repeated substantially as described except that following the addition of polyphenylene sulfide and C.O.D. to the Farrell Mill 5 parts of particulate antimony trioxide were added and the determination of Oxygen Index was omitted. The resultant molded product was characterized by an unsatisfactory degree of brittleness, i.e. its bar specimens could be broken manually with only a slight flexing pressure. The flame retardant testing results of this product are reported in Table 2 below.

EXAMPLES 10–20 (Controls)

In these Examples there were prepared and tested for flame retardance compositions which were substantially comparable to those of Examples 7, 8, and 9 except that one or more of the constituents of the compositions described in Examples 7, 8, and 9 were omitted. Where glass fibers were present as a constituent in these compositions, the procedure of Example 8 was employed substantially as described. Where glass fiber was absent, the procedure of Example 7 was employed substantially as described.

The flame retardant results of these comparative Examples are compared to those of Examples 7-9 in Table 2 below.

and Control Example 9 with Control Example 11). In contrast, the introduction of the halogenated organic flame retardant into the polyester in the absence of the sulfide polymer fails to enhance the resin flame retardance sufficiently to provide a satisfactory flame retardance at low specimen thickness (as is evident from a comparison of the data of Control Examples 15 and 16 with the results of Control Example 10).

It will be appreciated by those skilled in the art that

TABLE 2

| | EXAMPLE: (Control Examples in Parenthesis) | | | | | | | | | | | | | |
|---|---|---|---|---|---|---|---|---|---|---|---|---|---|---|
| | 7 | 8 | (9)* | (10) | (11) | (12) | (13) | (14) | (15) | (16) | (17) | (18) | (19) | (20) |
| CONSTITUENTS: (parts) | | | | | | | | | | | | | | |
| Bisphenol A-Isophthalate-Terephthalate Polyester | 450 | 450 | 450 | 1000 | 1500 | 450 | 450 | 450 | 450 | 450 | 450 | 450 | 450 | 450 |
| Polyphenylene Sulfide**** | 50 | 50 | 50 | — | 167 | 50 | 50 | 50 | — | — | — | — | — | — |
| C.O.D. | 20 | 20 | 20 | — | — | — | — | — | 17.8 | 17.8 | 17.8 | — | — | — |
| Glass Fiber | — | 58.3 | 58.3 | — | — | 58.3 | 58.3 | — | — | — | 52.5 | 52.5 | — | 52.5 |
| Antimony Oxide | — | — | 5 | — | — | 5 | — | 5 | — | 4.7 | — | — | 4.7 | 4.7 |
| | | | | | | | | | | | Mixture cannot be molded because of brittleness | | | |
| Vertical Burning Test Evaluations (UL-94) | | | | | | | | | | | | | | |
| 1/16 inch thickness specimen | V-0 | V-0 | ** | ** | V-0 | V-2 | V-0 | V-2 | V-1 | V-2 | * | V-0 | V-2 | V-2 |
| 1/32 inch thickness specimen | V-0 | V-0 | V-0 | V-1 | V-2 | V-2 | V-0 | V-2 | V-2 | V-2 | * | V-0 | V-2 | V-2 |
| Oxygen Index | 43.1 | 40.9 | ** | 37.2*** | 35.0 | 35.9 | 38.5 | 35.1 | 38.9 | 39.0 | | 40.4 | 37.2 | 37.5 |

NOTES:
*The product is unsatisfactory because of embrittlement
**Not determined
***Average of eight determinations ranging from 34.8 to 40.1
****Pure polyphenylene sulfide, because of its extreme brittleness, could not be made into 1/16 inch or thinner molded specimens and hence could not be tested for flame retardance.

In Control Example 11 the proportion of the polyester and the polyphenylene sulfide is 9:1 corresponding to the proportions of these constituents in Examples 7 and 8 and Control Examples 9, 12-14.

As is evident from the data of Table 2, Examples 7 and 8 provide excellent resin compositions according to the invention which by virtue of their C.O.D. constituents are additionally characterized by excellent flame retardance even at low specimen thickness, i.e. at specimen thicknesses less than 1/16 inch, as compared to comparable compositions devoid of C.O.D. (Control Examples 11-14).

The data of Control Examples 9, 12, and 14 indicate that the presence of an antimony constituent in admixture with the polyester and polyphenylene sulfide is undesirable either beause the antimony constituent increases the flammability of the compositions so as to render their low thickness flame retardancy unsatisfactory (as in Control Examples 12 and 14) or because the antimony oxide renders the composition undesirably brittle (as in Control 9).

The flammability behavior of resin mixtures containing both Bisphenol A-isophthalate-terephthalate polyester and polyphenylene sulfide is indicated by the data of Table 2 to be distinctive from the flammability behavior of resin compositions devoid of the polyphenylene sulfide component. Thus, for example, the introduction of the halogenated organic flame retardant additive into the polyester-polyphenylene sulfide blend enhances the flame retardancy of the blend to provide satisfactory flame retardance at low specimen thickness (as is indicated by a comparison of Examples 7 and 8 procedural modifications of the above-described experimental technique can be made without departing from the spirit and scope of the invention.

For example, in Example 7 a similar result providing a homogeneous glass filler-resin mixture can be obtained without the necessity of regrinding the molded glass fiber-containing resin product. In this alternative procedure the Farrell Mill resin product, after being ground to granules and dried, is added to the hopper end of a screw resin extruder (such as Haake Polytest 45 single screw extruder or a Werner Pfleider ZDS-K28 twin screw extruder) while the particulate glass component is added downstream on the extruder (alternatively, the particulate glass can be mixed with the dried ground granules with the resultant mixture being added to the hopper end of the extruder). The resultant extruded resin containing a homogeneous dispersion of the glass component is then sliced into pellets which are then injection molded as described in Example 7.

In place of the chopped glass fiber employed in the above Examples, other forms of particulate glass reinforcement agents such as uncut glass strands, glass rovings, glass pellets, pulverulent glass, and glass microballoons can also be used.

Instead of separate addition of the particulate glass constituent as described in Example 8, the latter constituent can be homogeneously blended with the sulfide constituent of the resin blend before the said sulfide polymer is added to the polyester.

In place of the halogenated organic additive C.O.D. substantially similar results in the above Examples are obtained employing another halogenated organic additive of the same generic structural formula as C.O.D. (said generic structural being delineated in the specification above), for example:

1,2,3,4,5,6,7,8,9,13,13,14,14-dodecachloro-1,4:5, 10:6, 9-trimethano-11H-benzo[b] fluorene, 1,2,3,4,5,6,7,8,10,10,11,11,-dodecachloro-1,4:5,8-dimethano-fluorene, 1,2,3,4,5,6,7,8,12,12,13,13-dodecachloro-1,4:5, 8:9,10-trimethanoanthracene, 1,2,3,4,5,6,7,8,11,11,12,12-dodecachloro-1,4,4a,5,8-,8a,9,9a,10,10a,decahydro-1,4,5,8-dmethanoanthracene;

1,2,3,4,6,7,8,9,10,11,11-dodecachloro-1,4,4a,5-,5a,6,9-,9a,9b-octahydro-1,4:6,9-dimethanodibenzothiophene; and 1,2,3,4,6,7,8,9,10,11,11-dodecachloro-1,4,4a,5-,5a,6,9-,9a,9b-octahydro-1,4:6,9-dimethanodibenzofuran, and The Diels Alder adduct of hexachlorocyclopentadiene and (ar) tetrabromostyrene.

These and similar halogenated organic compounds within the foregoing generic structural formula can be employed alone or in admixture with each other or the aforementioned C.O.D.

The invention has been described in the above specification and illustrated by reference to specific embodiments in the illustrative examples. However, it is to be understood that these embodiments are not intended to limit the invention since, as illustrated, changes and modifications in the specific details disclosed hereinabove can be made without departing from the scope or spirit of the invention.

What is claimed is:

1. In a thermoplastic polymeric composition comprising a mixture of (a) a linear aromatic polyester of components consisting essentially of a bisphenol and a dicarboxylic acid, and (b) polyphenylene sulfide, the improvement wherein the composition contains an effective flame retardant proportion of a halogen-containing Diels Alder adduct of
   (A) a cyclopentadiene wherein all of the hydrogen atoms of the carbon atoms joined by carbon-to-carbon double bonds have been replaced by halogen, selected from the group consisting of fluorine, chlorine, and bromine, and
   (B) an ethylenically unsaturated organic compound containing one or two carbon-to-carbon double bonds;
the molar proportion of the cyclopentadienyl residue to unsaturated compound residue in said adduct being 1:1 when the unsaturated compound contains one carbon-to-carbon double bond, and 2:1 when the unsaturated compound contains two carbon-to-carbon double bonds, said composition being substantially free of an antimony constituent.

2. The composition of claim 1 wherein the halogen-containing adduct of has the structural formula:

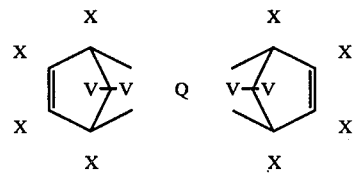

wherein X is selected from chlorine, bromine and fluorine, V is selected from chlorine, bromine, fluorine, alkyl of 1 to 10 carbon atoms, alkyloxy wherein the alkyl group contains 1 to 10 carbon atoms, haloalkyl and haloalkloxy wherein the alkyl groups contain 1 to 10 carbon atoms and halo is chloro, bromo, or fluoro; Q is a tetravalent saturated cyclic radical having at least 4 carbon atoms which may be substituted by alkyl groups of 1 to 6 carbon atoms, chlorine, bromine or fluorine.

3. The composition of claim 2 wherein said dicarboxylic acid has the structural formula

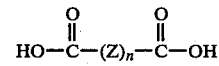

wherein Z is alkylene, —Ar— or —Ar—Y—Ar— where Ar is aromatic, Y is alkylene, of 1 to 10 carbons, haloalkylene, —O—, —S—, —SO—, —SO$_2$—, —SO$_3$—, —CO—,

or GN<, G is alkyl, haloalkyl, aryl, haloaryl, alkylaryl, haloalkylaryl, arylalkyl, haloarylalkyl, cycloalkyl, or halocycloalkyl, and n is 0 or 1, the halogen containing adduct is present in an amount of about 1 to about 50 weight percent based on the combined weight of the polyester and sulfide polymer, the polyphenylene sulfide is present in an amount of about 5 to about 95 weight percent based on the combined weight of the polyester and the polyphenylene sulfide and Q is a homocyclic ring of 5 to 18 carbon atoms.

4. The composition of claim 3 wherein said dicarboxylic acid is an aromatic dicarboxylic acid, the halogen-containing adduct is present in an amount of about 2 to about 30 weight percent based on the combined weight of the polyester and the polyphenylene sulfide and Q is a monocyclic ring.

5. The composition of claim 4 wherein said aromatic dicarboxylic acid is selected from the group consisting of isophthalic acid, terephthalic acid, and mixtures thereof, the polyphenylene sulfide is present in an amount of from about 5 to about 30 weight percent of the combined weight of the polyester and the polyphenylene sulfide and has a melt flow index in the range of from about 40 to about 7000, Q is a ring of 5 to 10 carbon atoms, and X and V are chlorine.

6. The composition of claim 5 wherein said bisphenol has the formula:

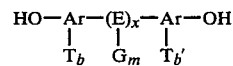

wherein Ar is aromatic, G is alkyl, haloalkyl, aryl, haloaryl, alkylaryl, haloalkylaryl, arylalkyl, haloarylalkyl, cycloalkyl, or cyclohaloalkyl; E is divalent alkylene, haloalkylene, cycloalkylene, halocycloalkylene, arylene, or haloarylene, —O—, —S—, —SO—, —SO$_2$—, —SO$_3$, —CO—,

or GN<; T and T' are independently selected from the group consisting of halogen, G and OG; m is an integer from 0 to the number of replaceable hydrogen atoms on E; b is an integer from 0 to the number of replaceable hydrogen atoms on Ar, and x is 0 or 1 and the halogen-containing adduct is present in an amount of about 3 to about 15 weight percent based on the combined weight of the polyester and the polyphenylene sulfide.

7. The composition of claim 6 wherein the bisphenol is bisphenol-A, and the halogen-containing adduct is 1,2,3,4,7,8,9,10,13,13,14,14-dodecachloro-1,4,4a,5,6,6a,7,10,10a,11,12,12a-dodecahydro-1,4:7,10-dimethanodibenzo [a,e] cyclooctene.

8. The composition of claim 1 which also includes a reinforcement effective amount of filler material.

9. The composition of claim 8 wherein said filler material is particulate glass present in an amount of about 5 to about 70 weight percent based on the combined weight of the polyester and the polyphenylene sulfide.

10. The composition of claim 9 wherein said particulate glass filler is glass fiber present in an amount of about 5 to about 40 weight percent based on the combined weight of the polyester and the polyphenylene sulfide.

11. A molded article formed from the composition of claim 1.

12. A flame retardant composition comprising in admixture a linear bisphenol A-isophthalate-terephthalate polyester wherein the ratio of isophthalate to terephthalate groups is from about 75:25 to about 90:10, about 5 to about 30 weight percent of polyphenylene sulfide based on the combined weight of the polyester and the polyphenylene sulfide, about 2 to about 30 weight percent based on the combined weight of the polyester and the polyphenylene sulfide of 1,2,3,4,7,8,9,10,13,13,13,14-dodecahalo-1,4,4a,5,6,6a,7,10,10a,11,12,12a-dodecahydro-1,4:7,10-dimethanodibenzo-[a,e] cyclooctene, the halo substituent being selected from the group consisting of chlorine and bromine and the composition being substantially free of an antimony constituent.

13. The composition of claim 12 wherein the halo substituent is chlorine.

14. The composition of claim 12 which also includes about 10 to about 40 weight percent of glass fibers based on the combined weight of the polyester and the polyphenylene sulfide.

15. The composition of claim 14 wherein the halo substituent is chlorine.

* * * * *